(12) United States Patent
Waris

(10) Patent No.: US 7,916,695 B2
(45) Date of Patent: Mar. 29, 2011

(54) SMART BUFFERING FOR POLICY ENFORCEMENT

(75) Inventor: Heikki Waris, Helsinki (FI)

(73) Assignee: Nokia Corporation, Espoo (FI)

( * ) Notice: Subject to any disclaimer, the term of this patent is extended or adjusted under 35 U.S.C. 154(b) by 1102 days.

(21) Appl. No.: 11/226,392

(22) Filed: Sep. 15, 2005

(65) Prior Publication Data

US 2006/0156383 A1 Jul. 13, 2006

(30) Foreign Application Priority Data

Dec. 31, 2004 (FI) .................................. 20041702

(51) Int. Cl.
- *H04W 4/00* (2009.01)
- *H04W 36/00* (2009.01)
- *G06F 15/16* (2006.01)

(52) U.S. Cl. .................. 370/331; 455/436; 709/229

(58) Field of Classification Search .......... 709/227–229; 714/4; 370/331; 455/436, 442
See application file for complete search history.

(56) References Cited

U.S. PATENT DOCUMENTS

| | | | |
|---|---|---|---|
| 6,587,466 B1 | 7/2003 | Bhattacharya et al. | |
| 6,625,150 B1 | 9/2003 | Yu | |
| 6,678,835 B1 * | 1/2004 | Shah et al. | 714/4 |
| 2002/0032788 A1 | 3/2002 | Emanuel et al. | |
| 2002/0069200 A1 * | 6/2002 | Cooper et al. | 707/9 |
| 2002/0098840 A1 * | 7/2002 | Hanson et al. | 455/435 |
| 2003/0046396 A1 * | 3/2003 | Richter et al. | 709/226 |
| 2003/0061332 A1 * | 3/2003 | Narad et al. | 709/223 |
| 2003/0120795 A1 * | 6/2003 | Reinshmidt | 709/232 |
| 2003/0130887 A1 * | 7/2003 | Nathaniel | 705/14 |
| 2004/0162083 A1 * | 8/2004 | Chen et al. | 455/454 |

FOREIGN PATENT DOCUMENTS

EP  1 071 226 A1  1/2001

* cited by examiner

*Primary Examiner* — Ian N Moore
*Assistant Examiner* — Jackie Zuniga
(74) *Attorney, Agent, or Firm* — Harrington & Smith

(57) ABSTRACT

The present invention discloses a method for smart buffering for a policy resolution and policy enforcement system. The invention can be applied to a communication system with one or several available communication network(s). The trigger events and policy actions form input and output buffers to be processed in the invention. Causal relationships between the trigger events and policy actions are stored. Priorities can be set to the trigger events and policy actions. Sorting is made according to priorities. The buffer data can be scheduled, in other words delayed, in order to rationalize the policy management. The buffer data is combined if several trigger events affect the same target or quantity. The buffer data is filtered in the last step in order to simplify chained trigger events. The trigger events of filtered input buffer are sent to the policy resolution mechanism and the policy actions of filtered output buffer are sent to the policy action enforcement.

54 Claims, 4 Drawing Sheets

SMART BUFFERING FOR POLICY ENFORCEMENT

FIELD OF THE INVENTION

The invention relates to a policy control mechanism, to be used for example in a mobile communication system.

BACKGROUND OF THE INVENTION

Mobile communication systems are dynamic systems where a huge number of characteristics varies all the time. The number of users, the types of services they use, the environment where the terminals are situated and the quality of the available connection, are examples of the varying parameters in mobile communication networks. When a certain observation is made (some quantity is measured or some change is observed in a system, for example) in the operation of the system, a desired policy can be triggered as a response. In other words, in order to create a functioning dynamic system (such as a mobile communication system) behaving as required, users and operators of the system can set policies, which define responses and actions in various situations that may occur. The policies must be configured and after that, managed, which can be called as a human interface of the policy control mechanism. Furthermore, the resolution and enforcement of the policies form the automated part of such a mechanism. It can be said that a trigger event initiates the resolution of a policy by acting as an input, and then instructions are sent as output which enforce the resolved policy action.

These inputs and outputs (the trigger events and policy actions, correspondingly) can generally be called as state changes. Trigger events are state changes already happened in the past while policy actions are state changes happening in the future. There is a possibility that some policies become trigger events for subsequent policies. This can happen because the only difference between a trigger event and a policy action is their timing and probability. There is a unidirectional causal relationship between the trigger events and policy actions where one state change can be traced forwards or backwards to another state change.

One example of a policy control mechanism is a multi-access situation where a device has multiple interfaces, logical accesses and connected network domains where connections can be established and traffic flows thereby occur. The device can have access to these multiple networks sequentially or simultaneously. Policies are therefore needed to describe which connection is acceptable over a particular network. Policies can also be used for managing the connections, such as switching between two connections in order to maintain connection quality.

One example of the policy resolution can include the following steps. When an interface is losing connectivity to a network, it can be detected as a trigger event. A new interface with a reachable connection is then needed to be found which can be called as a policy action. Also the joining into the new network, breaking out from the old connection and moving all traffic to the new network can be called as policy actions.

The policies can be very complicated and multiple trigger events can be received during a very short time period. Problems may arise concerning the scheduling of the policy actions. A decision must be made whether several policy actions considering the same device or connection are combined into one policy action or all policy actions are executed consecutively.

The inputs and outputs of the policy control mechanism, or generally state changes, could be provided with static priorities. The sorting process may be done simply by executing the highest priority task first, the second highest after that, and so forth. Alternatively, the sorting process can be done by giving weights to different classes of state changes. The criteria for the weight decisions can be made based on source or destination of the policy event or by looking at the severity of the event, which is to be recovered by the policy action.

The problem in prior art solutions is that the policy enforcement is not as efficient and quick as possible.

SUMMARY OF THE INVENTION

The present invention discloses a method for smart buffering of an input buffer and an output buffer for policy enforcement in a communication system. Trigger events are stored in the input buffer and the trigger event data is fed into a policy resolution mechanism. The policy resolution mechanism outputs one or several policy actions. It can be said that the policy actions together form an output buffer. The policy actions are fed into a policy action enforcement.

The causal relationships are found out in a group of all stored trigger events and policy actions. The trigger events and policy actions can be called together as state changes. There is a possibility to link a priority parameter into all or some trigger events and policy actions. If different priorities are present in state changes, the sorting process is possible based on the priority parameters. In order to give time for processing of the state changes and to avoid unnecessary state changes (which could be quickly changed back to the original state, for instance), scheduling is done to the input and/or output buffer contents. This means delaying the forwarding of inputs to the policy resolution and/or delaying the forwarding of outputs to the policy action enforcement. This gives time to possibly avoid the policy action with minor priority when there simultaneously exists a policy action with a high priority (for example, an emergency break of a connection).

The input and/or output buffer contents can then be combined which means putting together some policies, which affect the same quantity or the same target or physical block or function. This means that if there, for example, exists three orders to increase the transmitting power by 3 dB, they can be combined to one single order to increase the transmitting power by 9 dB. Therefore, no information is lost but the source information (the trigger event(s)) is rather rationalized.

The last step according to the invention is to filter the input and output filter contents. This means a slightly different issue than previous combining procedure because its purpose is to simplify chained trigger events and policy actions. In other words, if some policy action is a trigger event for another policy action, this procedure can be filtered in such a way that the result is one trigger event, which creates one policy action only. The filtering is made by cancelling and removing the data from the buffer. The result in most cases is a simplified input for the resolution because many trigger events can be reduced to a single trigger event.

When the input and output buffer are processed with these steps, the buffer data is ready to be fed into the policy resolution mechanism and the policy action enforcement.

The two consecutive causal relationships in the smart buffering according to the invention can happen in any ways within a group of input data and output data, except from input to output which is handled by the normal policy resolution.

In one embodiment of the invention a multi-access situation can be detected where a large number of state changes are handled simultaneously or within a short period of time. The multi-access situation typically can happen in horizontal or vertical handoff situation, or when the device activity level significantly changes, or when there exists a starting situation of a process, which initiates lots of connections.

The priority parameter of a certain trigger event or policy action can be changed. The modified priority parameters are used in further processing.

In one embodiment of the invention, the input and output buffers are conditionally sent forward. At first it has to be checked whether the trigger events with higher priorities have already been resulted in a decision or a policy action. After that check the selected parts of the input and/or output buffers are forwarded to the policy resolution mechanism and/or to the policy action enforcement.

In one embodiment of the invention the combining process can be made by simply summing the buffer contents affecting the same target or quantity. Another possibility is to use weight coefficients for the different buffer parts prior to summing. A third possibility is to choose the action with highest priority only and to neglect the actions with lower priorities.

Other embodiments the present invention include also a device and a system for smart buffering for policy enforcement in a communication system. In one embodiment the invention is implemented in a mobile communication system. Furthermore, in one embodiment according to the invention, the method is implemented with a processor and with a memory for the buffers to be saved.

The advantage of the present invention is that the method makes the policy enforcement procedure more efficient and quicker. The amount of trigger events and policy actions are reduced without any lost processes or lost data.

BRIEF DESCRIPTION OF THE DRAWINGS

The accompanying drawings, which are included to provide a further understanding of the invention and constitute a part of this specification, illustrate the method and apparatus of one embodiment of the invention and together with the description help to explain the principles of the invention. In the drawings.

DETAILED DESCRIPTION OF THE INVENTION

The present invention discloses a method for smart buffering of the input and output state changes of a policy resolution mechanism. The method utilizes knowledge of causal relationships between the state changes. The forwarding of the buffered state changes are scheduled based on the contents of either buffer.

Figure 1:
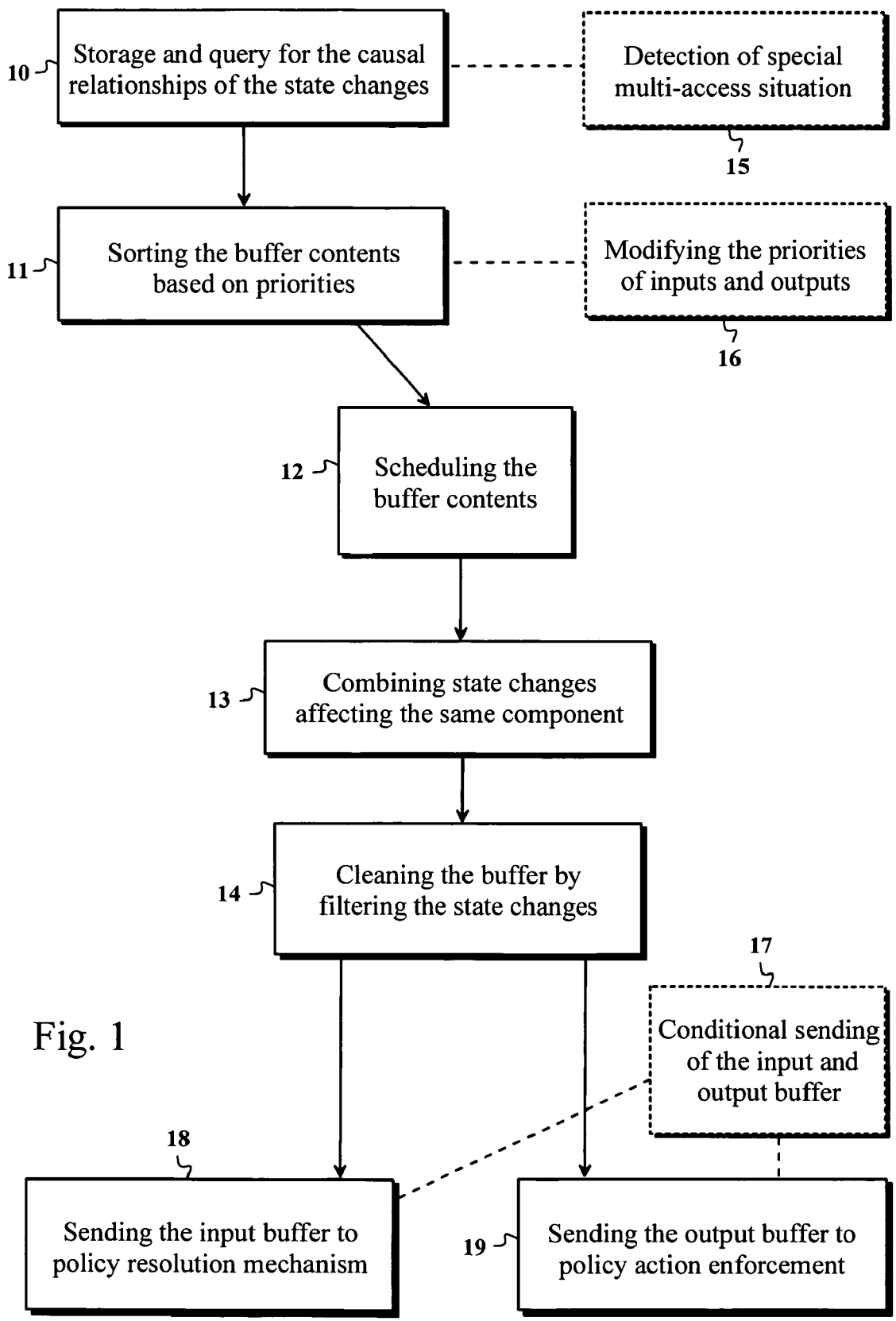
FIG. 1 illustrates an example of the method according to the invention for smart buffering for policy enforcement including smart filtering in multi-access situation.

FIG. 1 presents the core components of the present invention. The logic and conditions for the policy resolution are kept in a storage of logic and rules at step 10. The causal relationships of the state changes are therefore stored in the logic block at step 10. The logic and rules can be updated in order to make possible policy configuration and management. It can be said that trigger events and policy actions with their own priority parameters are stored in a buffer. According to the preferred embodiment, the buffer mechanism uses the policies of the policy resolution mechanism. Thus, the functionalities of the buffer and the resolution policies are closely interconnected, or in other words, synchonization between the two is needed because the buffer mechanism derives its functionalities from the resolution mechanism. The all causal relationships of the state changes at step 10 are not queried at the same time in the preferred embodiment. The relationships of a certain event or action are rather examined while that event or action is taken from the buffer for handling, one event or action at a time and during the whole resolution process. The causalities can also be examined before the event is being handled and in that case the causalities data can be saved to a cache until the event is actually handled.

At step 11 the buffer contents is sorted based on priorities. The priority parameter can be changed. The sorting mechanism (the implementation) itself can be chosen according to prior art.

At step 12 the buffer contents are scheduled. Forwarding of the trigger events (or more generally, inputs) can be delayed by a certain time in order to allow detection of causal relationships between the inputs which relate to each other or which are applied to the same function or physical component, for instance. The delay is targeted to the input(s) before the policy processing. Also the outputs can be delayed by a desired time period before the outputs are fed into the policy action enforcement. The delaying also gives time for sorting the inputs before further processing.

Then at step 13 the state changes that affect the same component are combined. If the state changes are in conflict with each other, in other words, they are changing the same quantity to a different absolute value for instance, the priority level attached to each state change defines which change takes place first and so on. If no priority data is available, or if all the priorities are the same, the combined state change is simply the sum of the conflicting changes. The state changes to be summed naturally have a sign. For instance, if the transmitter power is requested to be increased by 3 dB and the conflicting request is decreasing the transmitter power by 3 dB, the power change commands completely eliminate each other (if the commands have the same priority).

The combining process with the state changes affecting the same component typically results into one combined state change but one combining procedure can also result into several combined trigger events or policy actions. The latter situation can happen if some state changes are delayed compared to others or if there exist conditional (and thus, delayed) state changes.

The following action after combining is the cleaning of the buffer by filtering the state changes, step 14. A state change can be cancelled and removed from the buffer. This can be done if for instance only the latter change of two consecutive changes is needed for the precise definition of the end state.

For example, a first rule is to increase the transmitter output power by 6 dB. A second rule is to set the transmitter output power to a value 20 dBm. If the first and second rules are set simultaneously with similar priorities, the first rule is irrelevant for the end result. Therefore, the first rule can be filtered from the buffer, in other words, cancelled and removed and only the second rule takes place. As a result from the buffer cleaning process, there will be fewer inputs to the policy resolution component and the resolution can start from a single state that is better defined than a set of states.

In the end of the method according to the invention, the input buffer is sent to the policy resolution mechanism 18 and the output buffer is sent to the policy action enforcement 19.

Figure 2:
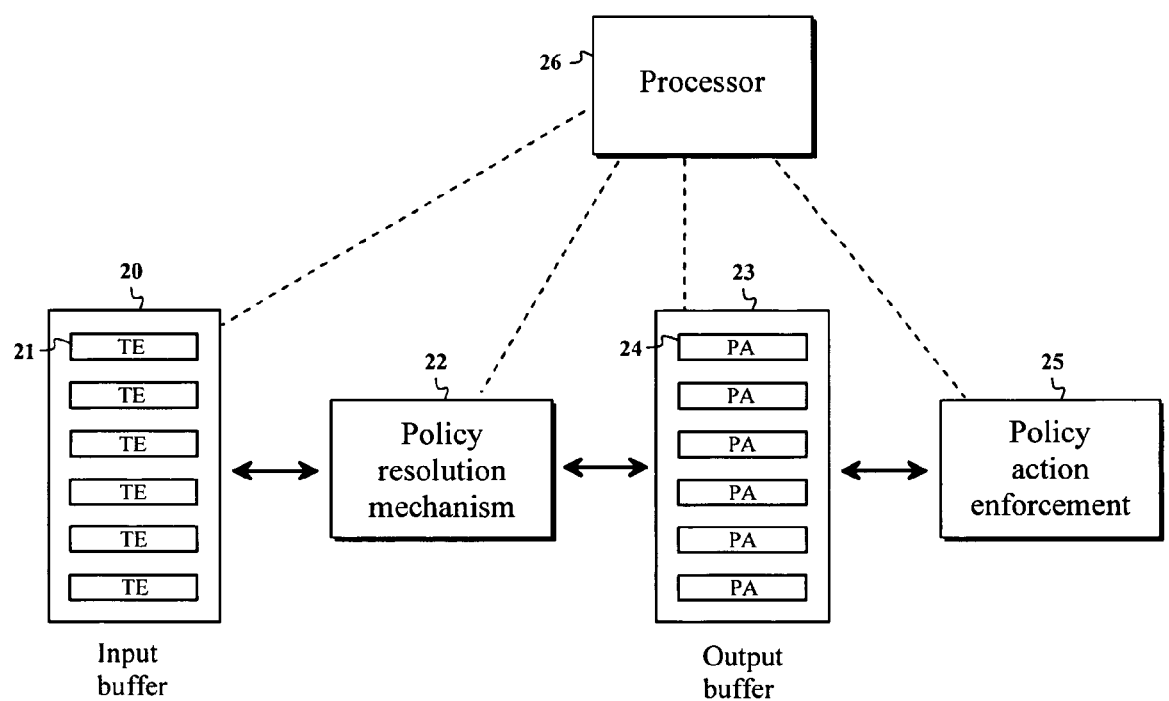
FIG. 2 illustrates a general structure of the needed functionalities according to one embodiment of the present invention.

FIG. 2 presents the essential functional parts of the present inventions. The existing functionalities used in the policy management of a multi-access mobile communication system are the policy resolution mechanism 22 and the policy action enforcement 25. The resolution 22 and enforcement 25 processes work as explained before and in prior art.

The present invention adds the concept of an input buffer 20 and an output buffer 23 to the existing policy management. The input buffer 20 is formed by gathering separate trigger events 21 into one database or buffer 20. The trigger events 21 are inputs to the policy resolution mechanism 22. The resolution block processes the input and the result is one or several policy actions 24 as the output. The output buffer 23 thus comprises the policy actions 24 received from the policy resolution 22. The policy actions 24 are fed into the policy action enforcement 25 for the actual execution of the desired policy. The smart buffering according to the invention is directed by the processor 26 which handles all functionalities and buffers mentioned before. It is notable that the data flow can also occur from the output buffer 23 to the policy resolution mechanism 22 and furthermore to the input buffer 20 because the outputs 24 can also trigger change in inputs 21. This can happen because both the trigger events 21 and the policy actions 24 can generally be considered state changes. This is explained more accurately in the following paragraphs.

The causal relationships between the state changes can occur in four basic ways which are "From input to output", "From input to input", "From output to output" and "From output to input".

"From input to output" is a procedure, which is carried by the policy resolution and therefore it is not covered by the operations in the smart buffer. Therefore, it is out of the scope of the invention.

"From input to input" situation is explained with two examples. For example, if a network becomes unreachable, all connections that went through it also become unreachable. The timing of transferring these trigger events to the input buffer depends on the detection of the events, and it may not be the same as the actual course of events. In order to resolve the root cause of the problem first, the method according to the invention detects that both types of trigger events exist in the input buffer and detects the causal relationship between them. It then sorts these events in such a way that the root cause trigger event is given for processing by the policy resolution first, and the other trigger events that are its probable consequences are given for processing after a short delay.

Another example is a causal relationship between states of a single object. An interface, which is very temporarily detected but very soon thereafter becomes unavailable again because of interference or poor coverage, should not trigger any policy resolution. Therefore, an initial state change from unavailable to available and a subsequent state change from available to unavailable should eliminate each other after combination, step 13.

"From output to output" is explained with an example, where a trigger event leads to a set of state changes that together fulfill the desired outcome. The policy resolution could have an object, such as the transmission power of an interface change with intervals of 10% of the maximum value instead of giving any absolute values. For ramping up the power from 50% to 100% for a service, the output buffer would receive five consecutive state changes affecting the same object of interface transmission power: 50% to 60%, 60% to 70%, 70% to 80%, 80% to 90% and 90% to 100%. The buffer would combine these into one output message that requests the transmission power of the interface to be increased from 50% to 100%.

Another example concerning "From output to output" situation includes aforementioned summing, priorities and the use of weight coefficients. A set of trigger events has possibly activated various parts of the policy resolution mechanism, which independently come up with state changes that coincidentally affect the same transmission power of a radio interface. The first policy action could be trying to limit interference with another interface and reduce the power from 50% to 10% of the maximum value, while another policy action might be trying to improve connectivity for a particular service and increase the power conservatively by 10% increments and therefore, from 50% to 60%. The combination could be either a sum of these (50%−40%+10%=20%, if there is no difference between the priorities between the outputs), either of these (50%−40%=10%, because radio stability is of higher priority than an individual service), or a weighted average of the factors (50%−1*40%+0.5*10%=25%, if priorities are reflected as weights instead of absolutes).

Figure 3A:
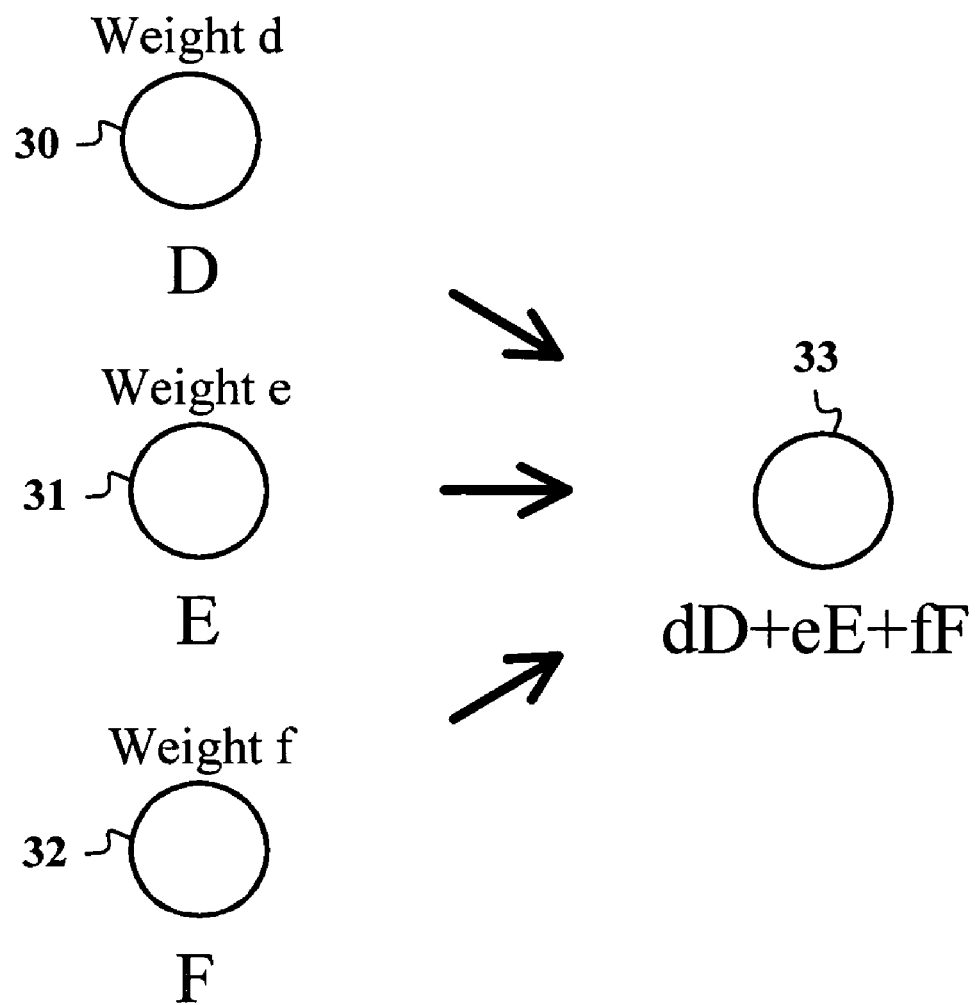
FIG. 3a illustrates an example of the combining procedure with weight coefficients as part of the present invention.

FIG. 3a presents generally the combining situation with weighted trigger events. There are three different trigger events D, E and F (30, 31 and 32 correspondingly) which are all focused to the same quantity or the same target object. The event D 30 has a weight coefficient "d", the event E 31 has a weight coefficient "e" ja similarly the event F 32 has a weight coefficient "f". When the combining is done according to the weights, the trigger events D, E and F can be replaced by a single trigger event 33 whose value is "dD+eE+fF". This single trigger event 33 contains now all the knowledge for a policy to be activated and therefore the trigger event 33 can be directed to the policy resolution mechanism.

"From output to input" situation may happen, for instance, when a sudden intrusion attempt is detected over a particular interface, or there is a significant sudden increase in volume of inbound traffic over a cellular link with high charging per byte. With these trigger events, the policy resolution could mandate an emergency disconnect of the network or teardown of the link, because the risk of not reacting is worse than the loss of connectivity for the services that were using that interface. In any case, the policy control first attempts to disconnect without first trying to move all connections to alternative interfaces. This will result in separate trigger events of unreachable connections as inputs, for which the causal relationship of network disconnect previously sent as output can be established. Such subsequent trigger events can then be cancelled from the input buffer (if there will not be an attempt to re-establish connectivity) or delayed (maybe for later cancellation because they are also resolved, but only after the high priority disconnect resolution).

The policy resolution can have a lot of interdependencies. In that case trigger events can lead to sometimes arbitrary and sometimes unpredictable subsequent state changes that may or may not also lead to loops in the resolution mechanism. These loops can cause a lot of unnecessary processing and needless state changes, and also perhaps instability may occur. This happens easily in a multi-access situation, where the terminal has a versatile connectivity to different types of networks with connections that require various levels of quality, transmission rate and security, for example. Furthermore, the terminal cannot control changes in its environment that define the availability of networks, services or a context that triggers the activation of its user defined policies.

One way to reduce the impact of complexity in the multi-access situation is to identify certain special situations, when it is likely that a decision done at an early time during the evolution of the situation will need to be changed at a later moment during the situation, or will postpone more important decisions that would speed up the resolution of a correct decision. The intention is to avoid making a bigger mistake by erroneous processing of all policy management, while accepting that there might be some temporarily mistreated policies (e.g. one data flow put to the wrong interface). But eventually the performance should be better.

In another embodiment of the invention some additional features are added to the main concept already disclosed earlier. These added features are also presented in FIG. 1. The first feature is the detection of special multi-access situation 15 when it is likely that a large number of changes will be done. These are typically changes to a large number of traffic flows. They can also be changes to intermediate parameters that aggregate a set of context-dependent parameters into a generic parameter that can be used later in policy resolution, and eventually also affect flows (for example, various parameters aggregated to a single "security level" parameter).

These multi-access situations include also horizontal and especially vertical handoffs. They can be detected easily as deactivation and/or activation of the related interfaces or change in the access or reachability that the device has over such a network.

Another multi-access situation is the device activity level. This can be detected from the operating system going into or coming out of an energy saving (or hibernation) mode, or while the system is not reaching normal running level after booting, or while the system is going into the shutdown process. Device activity change can also be detected by considering the user logging in and logging out. This affects the traffic created by the user and also the properties of a certain user can be automatically enforced or removed in the policy resolution.

A third example of the multi-access situation is the starting of a process that automatically initiates connections. This can be detected from the operating system initiation of an application such as a browser (with automatic subscription to chosen channels or downloading or caching the start page and frequently requested sites), an agent (with automatic, perhaps scheduled, queries and updates on behalf of the user), or a P2P (peer-to-peer) application (with automatic attempts at establishing multiple connections to each peer, and with retries if the peer is not suitable for use by the local P2P application).

The second feature is modifying the priority of inputs and outputs 16 which are used for initiating and enforcing changes. This feature can be done between the steps of 10 and 11 in FIG. 1, for instance. The priorities are then used in the sorting and scheduling procedure of the inputs and outputs before sending them to the policy resolution or to the policy enforcement.

An example of the different priority levels and the inputs/outputs using those priorities is presented in the following. The highest priority can be linked to the changes in the lowest layer and the most common parameters, which describe or control the connectivity of the device, such as the interface availability or the network reachability (including access control state).

The second highest priority level can be called as an increased priority which can be linked for example to the changes in the fundamental connectivity context which sets requirements to flow parameters (e.g. mobility and security), such as activation of connectivity to a virtual private network (VPN) or to a similar network where the joined domain has a high degree of control over the multi-access policies of the terminal, and therefore affects especially flows that are not part of or not approved by that domain. The increased priority can also be applied to the activation or deactivation of processes (for example as a result of going into power saving mode), which are responsible for creating traffic that initiates and maintains flows in the first place.

The third highest priority level can be called an unchanged priority, which indicates this priority level to be the neutral or reference point of all the priorities being set. This unchanged priority can be linked to the inputs and outputs not listed here demanding a higher or lower priority.

The second lowest of this five-step priority level scale is the decreased priority. This priority can be linked, for instance, to changes caused by automatic application of the qualities of the access networks, interfaces or flows that utilize them (e.g. available bandwidth, bit error ratio or delay), which are temporary and can change or fluctuate significantly during the special situation.

The lowest priority can be associated with changes that are not expected to take place immediately, and which have been given only coincidentally or without explicit intent at the time of the special situation, such as user configuration of preferences, profiles and policies (for example price and quality of service, QoS), especially if they are combined with some context information.

The third feature included in one embodiment according to the invention is the conditional sending of buffered inputs and outputs to policy resolution or policy enforcement at step 17, carried out after the confirmation that the changes with higher priority have resulted in a decision or to an enforced policy action.

For example, context-related updates to user policies will not be sent to the policy resolution during a handover situation until the new interface has become available and the new access network has been connected. This prevents making temporary changes that would need to be changed (immediately or later) after the completion of the handover.

Another example of the conditional sending is the unifying of the context for similar events or actions, which take place during the special situation within a short duration. During a handover, all flows should be treated within the same context so that, for example, one flow is not given a low QoS level (because at that specific time during the handover the connectivity was only able to use a fall-back interface and access network), while another similar flow is given a high QoS level (because at that specific time during the handover the connectivity has been restored with a broadband interface and access network).

Figure 3B:
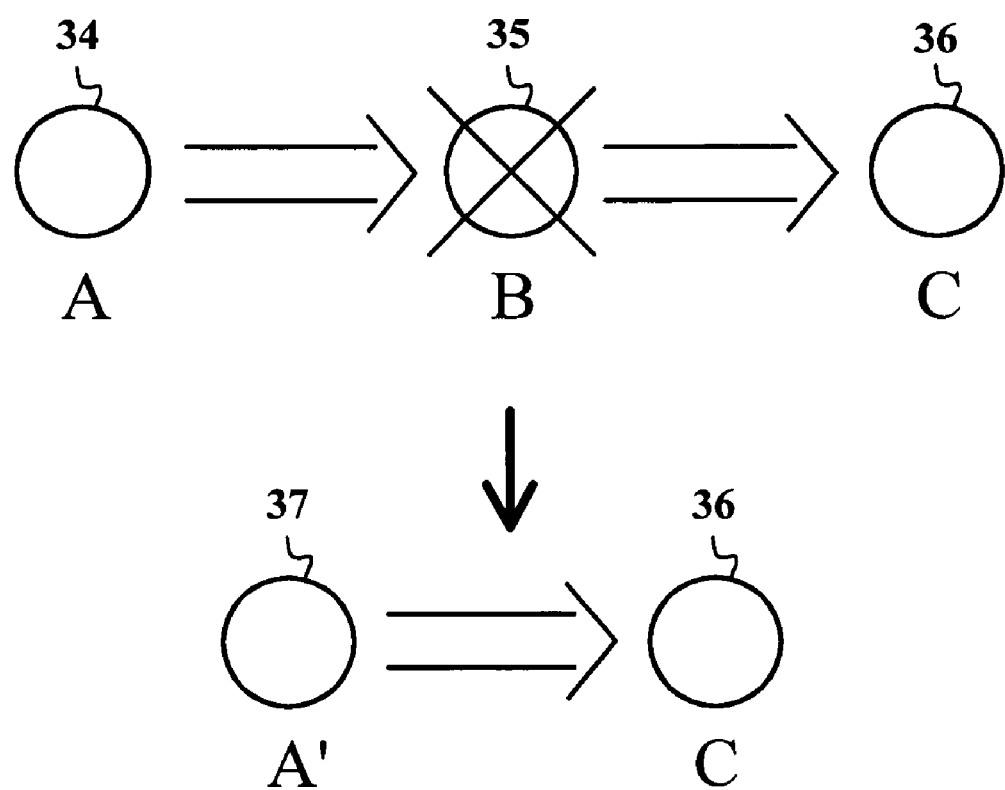
FIG. 3b illustrates an example of the filtering procedure as part of the present invention.

The principle of filtering is explained generally in FIG. 3b. A trigger event A 34 triggers a policy action B 35 via a policy resolution procedure. The policy action 35 is in this example not the end of the state change chain. Thus, the policy action B 35 actually becomes a new trigger event to be processed. This new trigger event B 35 is thus fed to a policy resolution again and the result is a new policy action C 36.

For example, if A means "create the connection to the network element $E_{new}$ for the user X" and if B means "release a connection to the network element $E_{old}$ for the user X", the chain 34, 35 and 36 discloses a simple handoff situation. The policy action 35 inevitably becomes a trigger event where the connection release is forced to be made in order to avoid gratuitous double connection to two parallel network elements. The filtering process removes the B 35 from the buffer and simplifies the process into one trigger event A' 37 and one policy action C 36. The A' 37 is in this case "Execute the handoff to the neighboring cell" and policy action C 36 executing both the connection and the release is fed to the policy action enforcement block. It is notable that the output buffer C 36 remains the same in this example before and after the filtering process.

It is obvious to a person skilled in the art that with the advancement of technology, the basic idea of the invention may be implemented in various ways. The invention and its embodiments are thus not limited to the examples described above, instead they may vary within the scope of the claims.

The invention claimed is:

1. A method comprising:
   scheduling input buffer contents and output buffer contents by delaying for a certain time period a forwarding of at least one trigger event to a policy resolution mechanism and at least one policy action to a policy action enforcement;
   in response to expiration of the certain time period, using at least stored causal relationships, examining the input and output buffer contents, including delayed contents, to determine causal relationships between trigger events in the input buffer, or between policy actions in the output buffer, or between policy actions in the output buffer and trigger events in the input buffer; and
   for the determined causal relationships, performing the following actions:
   determining priorities for the trigger events in the input buffer and priorities for the policy actions in the output buffer;
   sending higher priority trigger events to the policy resolution mechanism prior to sending lower priority trigger events and sending higher priority policy actions to the policy action enforcement prior to sending lower priority policy actions; and
   combining input buffer contents, including delayed contents, affecting a same target or quantity into at least one combined trigger event and output buffer contents, including delayed contents, respectively into at least one combined policy action, wherein the combining may include canceling one or more of the trigger events in the input buffer or one or more of the policy actions in the output buffer.

2. The method according to claim 1, wherein the actions further comprise:
   filtering the input and output buffer contents, including delayed contents, by removing policy actions which are trigger events for further policy actions.

3. The method according to claim 2, wherein the actions further comprise:
   sending at least one filtered trigger event of a filtered input buffer to the policy resolution mechanism.

4. The method according to claim 2, wherein the actions further comprise:
   sending at least one filtered policy action of a filtered output buffer to the policy action enforcement.

5. The method according to claim 1, wherein the method is used in a multi-access situation in a mobile terminal.

6. The method according to claim 1, wherein the method is used in network element management.

7. The method according to claim 5, wherein the multi-access situation is a horizontal or a vertical handoff situation, a situation with a device data flow activity being notably changed or a starting situation of a process, which initiates connections.

8. The method according to claim 1, wherein the actions further comprise:
   sending selected contents of the input buffer to the policy resolution mechanism and selected contents of the output buffer to the policy action enforcement if contents with higher priorities have resulted in a decision or an enforced policy action.

9. The method according to claim 1, wherein combining further comprises:
   combining the buffer contents affecting the same target or quantity by summing corresponding parts of the buffer.

10. The method according to claim 1, wherein combining further comprises:
    defining weights for different parts of the buffer contents affecting the same target or quantity; and
    combining the buffer contents affecting the same target or quantity by weighted summing of corresponding parts of the buffer.

11. The method according to claim 1, wherein combining further comprises:
    combining the buffer contents affecting the same target or quantity by selecting a part of the buffer with the highest priority.

12. The method according to claim 1, further comprising based at least in part on defined priority parameters, sorting contents, including delayed contents, for at least one of the input buffer or output buffer, and wherein sending further comprises determining priority of the trigger events or the policy actions based on the sorted contents for the at least one of the input buffer or output buffer.

13. The method according to claim 12, further comprising:
    modifying the defined priority parameters of at least one particular trigger event or policy action; and
    using modified defined priority parameters in the sorting.

14. An apparatus, comprising:
    a policy database configured to store causal relationships within a group of trigger events and policy actions;
    an input buffer configured to output to a policy resolution mechanism and an output buffer configured to accept input from the policy resolution mechanism and output to a policy action enforcement; and
    a processor configured to:
    schedule the input buffer and output buffer contents by delaying for a certain time period a forwarding of at least one trigger event to a policy resolution mechanism and at least one policy action to a policy action enforcement;
    examine, in response to expiration of the certain time period and using at least stored causal relationships, the input and output buffer contents, including delayed contents, to determine causal relationships between trigger events in the input buffer, or between policy actions in the output buffer, or between policy actions in the output buffer and trigger events in the input buffer;
    perform, for the determined causal relationships, the following actions
    determining priorities for the trigger events in the input buffer and priorities for the policy actions in the output buffer;
    send higher priority trigger events to the policy resolution mechanism prior to sending lower priority trigger events and send higher priority policy actions to the policy action enforcement prior to sending lower priority policy actions; and
    combine the input buffer contents, including delayed contents, affecting a same target or quantity into at least one combined trigger event and the output buffer contents, including delayed contents, respectively into at least one combined policy action, wherein the combining may include canceling one or more of the trigger events in the input buffer or one or more of the policy actions in the output buffer.

15. The apparatus according to claim 14,
wherein the processor is configured, when performing one or more of the following actions, to filter the input and output buffer contents by removing policy actions which are trigger events for further policy actions.

16. The apparatus according to claim 15,
the processor is configured, when performing one or more of the following actions, to send at least one filtered trigger event of a filtered input buffer to the policy resolution mechanism.

17. The apparatus according to claim 15,
wherein the processor is configured, when performing one or more of the following actions, to send at least one filtered policy action of a filtered output buffer to the policy action enforcement.

18. The apparatus according to claim 14, wherein the apparatus is used in a multi-access situation in a mobile terminal.

19. The apparatus according to claim 14, wherein the apparatus is used in network element management.

20. The apparatus according to claim 18, wherein the multi-access situation is a horizontal or a vertical handoff situation, a situation with a device data flow activity being notably changed or a starting situation of a process, which initiates connections.

21. The apparatus according to claim 14,
wherein the processor is configured, when performing one or more of the following actions, to send selected contents of the input buffer to the policy resolution mechanism and selected contents of the output buffer to the policy action enforcement if contents with higher priorities have resulted in a decision or an enforced policy action.

22. The apparatus according to claim 14,
wherein the processor is configured, when combining, to combine the buffer contents affecting the same target or quantity by summing corresponding parts of the buffer.

23. The apparatus according to claim 14,
wherein the processor is configured, when combining, to:
define weights for different parts of the buffer contents affecting the same target or quantity, and
combine the buffer contents affecting the same target or quantity by weighted summing of a corresponding parts of the buffer.

24. The apparatus according to claim 14,
wherein the processor is configured, when combining, to combine the buffer contents affecting the same target or quantity by selecting a~part of the buffer with the highest priority.

25. The apparatus according to claim 14, wherein the processor is further configured, based at least in part on defined priority parameters, to sort contents, including delayed contents, for at least one of the input buffer or output buffer, and wherein the processor is further configured, when sending, to determine priority of the trigger events or the policy actions based on the sorted contents for the at least one of the input buffer or output buffer.

26. The apparatus according to claim 25 wherein:
the processor is configured to:
modify the defined priority parameters of at least one particular trigger event or policy action, and
use modified defined priority parameters in the sorting.

27. A system, comprising:
a policy database configured to store causal relationships within a group of trigger events and policy actions;
an input buffer configured to output to a policy resolution mechanism and an output buffer configured to accept input from the policy resolution mechanism and output to a policy action enforcement; and
a smart buffering device configured to:
schedule the input buffer and output buffer contents by delaying for a certain time period a forwarding of at least one trigger event to a policy resolution mechanism and at least one policy action to a policy action enforcement;
examine, in response to expiration of the certain time period and using at least stored causal relationships, the input and output buffer contents, including delayed contents, to determine causal relationships between trigger events in the input buffer, or between policy actions in the output buffer, or between policy actions in the output buffer and trigger events in the input buffer;
perform, for the determined causal relationships, the following actions:
determining priorities for the trigger events in the input buffer and priorities for the policy actions in the output buffer;
send higher priority trigger events to the policy resolution mechanism prior to sending lower priority trigger events and send higher priority policy actions to the policy action enforcement prior to sending lower priority policy actions; and
combine the input buffer contents, including delayed contents, affecting a same target or quantity into at least one combined trigger event and the output buffer contents, including delayed contents, respectively into at least one combined policy action, wherein the combining may include canceling one or more of the trigger events in the input buffer or one or more of the policy actions in the output buffer.

28. The system according to claim 27,
wherein the smart buffering device is configured, when performing one or more of the following actions, to filter the input and output buffer contents, including delayed contents, by removing policy actions which are trigger events for further policy actions.

29. The system according to claim 27, wherein the system is a mobile communication system.

30. The system according to claim 27, wherein the smart buffering device is further configured, based at least in part on defined priority parameters, to sort contents, including delayed contents, for at least one of the input buffer or output buffer, and wherein the processor is further configured, when sending, to determine priority of the trigger events or the policy actions based on the sorted contents for the at least one of the input buffer or output buffer.

31. The system according to claim 30,
wherein the smart buffering device is configured to:
modify the defined priority parameters of at least one particular trigger event or policy action, and
use modified defined priority parameters in the sorting.

32. A computer program embodied on a non-transitory computer readable storage medium, the computer program controlling a processor to perform:
scheduling input buffer contents and output buffer contents by delaying for a certain time period a forwarding of at least one trigger event to a policy resolution mechanism and at least one policy action to a policy action enforcement;
in response to expiration of the certain time period, using at least stored causal relationships, examining the input and output buffer contents, including delayed contents, to determine causal relationships between trigger events in the input buffer, or between policy actions in the output buffer, or between policy actions in the output buffer and trigger events in the input buffer; and for the determined causal relationships, performing the following actions:

determining priorities for the trigger events in the input buffer and priorities for the policy actions in the output buffer;

sending higher priority trigger events to the policy resolution mechanism prior to sending lower priority trigger events and send higher priority policy actions to the policy action enforcement prior to sending lower priority policy actions; and combining the input buffer contents, including delayed contents, affecting a same target or quantity into at least one combined trigger event and the output buffer contents, including delayed contents, respectively into at least one combined policy action, wherein the combining may include canceling one or more of the trigger events in the input buffer or one or more of the policy actions in the output buffer.

33. The computer program according to claim 32, further controlling a processor to perform, as an additional one of the actions:

filtering the input and output buffer contents, including delayed contents, by removing policy actions which are trigger events for further policy actions.

34. The computer program according to claim 33, further controlling a processor to perform, as an additional one of the actions:

sending at least one filtered trigger event of a filtered input buffer to the policy resolution mechanism.

35. The computer program according to claim 33, further controlling a processor to perform, as an additional one of the actions:

sending at least one filtered policy action of a filtered output buffer to the policy action enforcement.

36. The computer program according to claim 32, wherein the computer program is used in a multi-access situation in a mobile terminal.

37. The computer program according to claim 32, wherein the computer program is used in network element management.

38. The computer program according to claim 37, wherein the multi-access situation is a horizontal or a vertical handoff situation, a situation with a device data flow activity being notably changed or a starting situation of a process, which initiates connections.

39. The computer program according to claim 32, further controlling a processor to perform, as an additional one of the actions:

sending selected contents of the input buffer to the policy resolution mechanism and selected contents of the output buffer to the policy action enforcement if contents with higher priorities have resulted in a decision or an enforced policy action.

40. The computer program according to claim 32, further controlling a processor to perform, when combining:

combining the buffer contents affecting the same target or quantity by summing corresponding parts of the buffer.

41. The computer program according to claim 32, further controlling a processor to perform, when combining:

defining weights for different parts of the buffer contents affecting the same target or quantity; and combining the buffer contents affecting the same target or quantity by weighted summing of corresponding parts of the buffer.

42. The computer program according to claim 32, further controlling a processor to perform, when combining:

combining the buffer contents affecting the same target or quantity by selecting a part of the buffer with the highest priority.

43. The computer program according to claim 32, further controlling a processor to perform, based at least in part on defined priority parameters, sorting contents, including delayed contents, for at least one of the input buffer or output buffer, and wherein the action of sending further comprises determining priority of the trigger events or the policy actions based on the sorted contents for the at least one of the input buffer or output buffer.

44. The computer program according to claim 43, further controlling a processor to perform:

modifying the defined priority parameters of at least one particular trigger event or policy action; and using modified defined priority parameters in the sorting action.

45. A method comprising in a mobile terminal comprising hardware and software components configurable via state changes for establishing, maintaining and terminating wireless connectivity with at least one communication network, buffering mobile terminal-related trigger events in a first buffer;

determining an existence, if any, of causal relationships between two or more buffered trigger events in accordance with stored causal relationships, the buffered trigger events including both delayed and current trigger events, where determining comprises considering priority parameters associated with the buffered trigger events to determine priority for an existing set, if such a set exists, of trigger events associated with a causal relationship, and further comprises combining, if possible, two or more buffered trigger events into a single trigger event;

performing policy resolution on the buffered trigger events to create a corresponding resulting set of policy actions, the performing including performing policy resolution on trigger events in the set having higher priority prior to performing policy resolution on trigger events having lower priority;

buffering the corresponding resulting set of policy actions in a second buffer;

determining an existence, if any, of a relationship between two or more buffered policy actions that pertain to a same mobile terminal component and deriving, if possible, at least one corresponding buffered policy action; and enforcing a corresponding resulting set of policy actions to effect at least one mobile terminal component state change so as to at least one of establish, maintain or terminate wireless connectivity with the least one communication network.

46. The method as in claim 45, where determining an existence, if any, of causal relationships further comprises determining an existence, if any, of a causal relationship between at least one buffered trigger event and at least one buffered policy action.

47. The method as in claim 45, where a triggering event comprises an existence of a horizontal or a vertical handoff situation.

48. The method as in claim 45, where a triggering event comprises a change in data flow activity between the mobile terminal and the at least one communication network.

49. The method as in claim 45, where a triggering event comprises an initiation of a process in the mobile terminal that implies a need to establish at least one connection with the at least one communication network.

50. The method of claim 49, where the process is comprised of one of a browser, an agent configured to make a query, and a peer-to-peer application configured to establish a connection with at least one other peer.

51. The method as in claim 45, where a triggering event comprises an input from a user of the mobile terminal.

52. The method as in claim 45, where a trigger event comprises a change in activity level of the mobile terminal.

53. The method as in claim 45, where considering priority parameters further comprises, considering associated weights for at least some trigger events, and where determining combining further comprises combining the at least some trigger events into the single event based on the associated weights.

54. The method as in claim 45, where at least one of determining an existence, if any, of causal relationships and determining an existence, if any, of a relationship between two or more buffered policy actions further comprises initially delaying the determining of the existence of causal relationships and delaying the determining the existence of the relationship for some period of time.

* * * * *